(12) United States Patent
Chang et al.

(10) Patent No.: US 11,079,548 B2
(45) Date of Patent: Aug. 3, 2021

(54) OPTICAL CONNECTION APPARATUS AND OPTICAL CONNECTION METHOD USING THE SAME

(71) Applicant: ELECTRONICS AND TELECOMMUNICATIONS RESEARCH INSTITUTE, Daejeon (KR)

(72) Inventors: Sun Hyok Chang, Daejeon (KR); Joon Ki Lee, Sejong-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 3 days.

(21) Appl. No.: 16/672,600

(22) Filed: Nov. 4, 2019

(65) Prior Publication Data

US 2020/0292759 A1    Sep. 17, 2020

(30) Foreign Application Priority Data

Mar. 12, 2019  (KR) .......................... 10-2019-0028435

(51) Int. Cl.
    *G02B 6/30*    (2006.01)
    *G02B 6/32*    (2006.01)
    *G02B 6/34*    (2006.01)

(52) U.S. Cl.
    CPC ............... *G02B 6/305* (2013.01); *G02B 6/32* (2013.01); *G02B 6/34* (2013.01)

(58) Field of Classification Search
    CPC . G02B 6/305; G02B 6/30; G02B 6/32; G02B 6/34; G02B 6/13
    See application file for complete search history.

(56) References Cited

U.S. PATENT DOCUMENTS

| 10,739,519 B2 * | 8/2020 | Watte ...................... G02B 6/305 |
| 2009/0304331 A1 | 12/2009 | Herman et al. |
| 2014/0153873 A1 | 6/2014 | Kang et al. |
| 2014/0360013 A1 | 12/2014 | Chen |
| 2018/0100970 A1 | 4/2018 | Park et al. |

FOREIGN PATENT DOCUMENTS

KR    10-2005-0041461 A    5/2005

OTHER PUBLICATIONS

S. Gross et al., "Ultrafast-laser-inscribed 3D integrated photonics: challenges and emerging applications", Nanophotonics 2015; 4: p. 332-352, Jul. 30, 2015.

* cited by examiner

*Primary Examiner* — John Bedtelyon
(74) *Attorney, Agent, or Firm* — LRK Patent Law Firm (57) ABSTRACT

An optical connection apparatus includes a position fixing portion configured to fix optical circuits each having a different end portion, while interposing a connection member that is optically imprintable between the optical circuits, and an optical-imprinting portion configured to emit light to the connection member to form a three-dimensional (3D) optical waveguide in the connection member that connects the optical circuits to each other.

13 Claims, 11 Drawing Sheets

OPTICAL CONNECTION APPARATUS AND OPTICAL CONNECTION METHOD USING THE SAME

CROSS-REFERENCE TO RELATED APPLICATION

This application claims priority to and the benefit of Korean Patent Application No. 10-2019-0028435, filed on Mar. 12, 2019, the disclosure of which is incorporated herein by reference in its entirety.

BACKGROUND

1. Field of the Invention

The present invention relates to an optical connection apparatus and an optical connection method using the same, and more specifically, to an optical connection apparatus capable of connecting a plurality of optical circuits each constituted of a photonic integrated circuit (PIC) using a three-dimensional optically-imprinted optical waveguide, and a connection method using the same.

2. Discussion of Related Art

In general, a photonic integrated circuit (PIC) implements an optical circuit having an optical waveguide, an optical coupler, an optical device, and the like, using silicon, silica, indium phosphide (InP), or the like.

Recently, there has been growing attention on silicon photonics technology in which various optical components and functions based on optical waveguides are integrated on a silicon-on-insulator (SOI) substrate.

The silicon photonics technology enables the use of a complementary metal oxide semiconductor (CMOS) process that is usable for mass production of high integration electrical circuits, so it is expected to allow mass production of low-priced PICs.

In order to use such PICs, an efficient optical connection method for connecting optical inputs/outputs and chips of another PIC is needed. In particular, PICs are based on a planar optical waveguide, and thus a great optical loss may occur in connecting input/output optical fibers.

A PIC chip fabricated by silicon photonics has a small optical mode, of 1 um, in a PIC optical waveguide with a great difference in size from that of an optical fiber, which may cause a great optical loss.

As prior art relevant to the present invention, Korean Patent Publication No. 10-2005-0041461 (May 4, 2005) discloses an optical coupling apparatus and a method of manufacturing the same.

SUMMARY OF THE INVENTION

The present invention is directed to providing an optical connection apparatus and an optical connection method using the same, in which a connection member capable of being optically imprinted is fixed at a position that requires a connection, and the connection member is optically imprinted to form a three-dimensional optical waveguide.

The technical objectives of the present invention are not limited to the above, and other objectives may become apparent to those of ordinary skill in the art based on the following descriptions.

According to an aspect of the present invention, there is provided an optical connection apparatus including a position fixing portion configured to fix optical circuits having different end portions, while interposing a connection member that is optically imprintable between the optical circuits, and an optical-imprinting portion configured to emit light to the connection member to form a three-dimensional (3D) optical waveguide, which connects the optical circuits, in the connection member.

The optical-imprinting portion may adjust both ends of the 3D optical waveguide to correspond to sizes and shapes of end portions of the optical circuits.

The optical-imprinting portion may form both ends of the 3D optical waveguide into tapered shapes to correspond to sizes and shapes of end portions of the optical circuits.

The optical-imprinting portion may allow both ends of the 3D optical waveguide to be connected with a mode converter in the form of a grating coupler.

The optical-imprinting portion may include: a laser configured to emit light to a predetermined point of the connection member; a focusing lens through which the light emitted by the laser passes; and a position adjusting device configured to shift a position of the laser and the focusing lens.

The optical-imprinting portion may further include a controller configured to control driving of the laser and the position adjusting device, wherein the controller may compare a predetermined reference value with a refractive index value of the connection member, which varies at a time of the connection member being imprinted by the light passing through the focusing lens, and drives the position adjusting device.

The connection member may include at least one material selected from the group consisting of silica, phosphates, heavy metal oxides, chalcogenides, and halides such that the connection member has a refractive index varied by the light emitted by the optical-imprinting portion.

The connection member may include at least one material selected from the group consisting of lithium fluoride, lithium niobate, strontium barium niobate, and yttrium aluminum garnet such that the connection member has a refractive index varied by the light emitted by the optical-imprinting portion.

According to another aspect of the present invention, there is provided an optical connection apparatus including a position fixing portion configured to fix a plurality of optical circuits having end portions differing in size and shape, and to place, on the plurality of optical circuits, a connection member that is optically imprintable, and an optical-imprinting portion configured to emit light to the connection member to form a three-dimensional (3D) optical waveguide in the connection member that connects the optical circuits to each other.

According to another aspect of the present invention, there is an optical connection method including fixing positions of optical circuits having different end portions, while interposing a connection member that is optically imprintable between the optical circuits, optically imprinting the connection member by emitting light to the connection member to form a three-dimensional (3D) optical waveguide in the connection member, and connecting both ends of the 3D optical waveguide to the optical circuits.

The optically imprinting may include forming both ends of the 3D optical waveguide into tapered shapes to correspond to sizes and shapes of end portions of the optical circuits.

According to another aspect of the present invention, there is an optical connection method including: fixing positions of a plurality of optical circuits having end portions differing in size and shape, and placing, on the plurality of optical circuits, a connection member that is optically imprintable; optically imprinting the connection member by emitting light to the connection member to form a three-dimensional (3D) optical waveguide in the connection member; and connecting both ends of the 3D optical waveguide to the plurality of optical circuits.

DETAILED DESCRIPTION OF EXEMPLARY EMBODIMENTS

Hereinafter, advantages and features of the present invention and manners of achieving them will become readily apparent with reference to descriptions of the following detailed embodiments when considered in conjunction with the accompanying drawings. However, the scope of the present invention is not limited to such embodiments, and the present invention may be embodied in various forms. The embodiments to be described below are embodiments provided only to complete the disclosure of the present invention and assist those skilled in the art in fully understanding the scope of the present invention. The present invention is defined only by the scope of the appended claims. Meanwhile, terms used herein are used to aid in the explanation and understanding of the present invention and are not intended to limit the scope and spirit of the present invention. It should be understood that the singular forms "a," "an," and "the" also include the plural forms unless the context clearly dictates otherwise. The terms "comprises," "comprising," "includes," and/or "including," when used herein, specify the presence of stated features, integers, steps, operations, elements, components and/or groups thereof, and do not preclude the presence or addition of one or more other features, integers, steps, operations, elements, components, and/or groups thereof.

Hereinafter, exemplary embodiments of the present invention will be described in detail with reference to the accompanying drawings.

Figure 1:
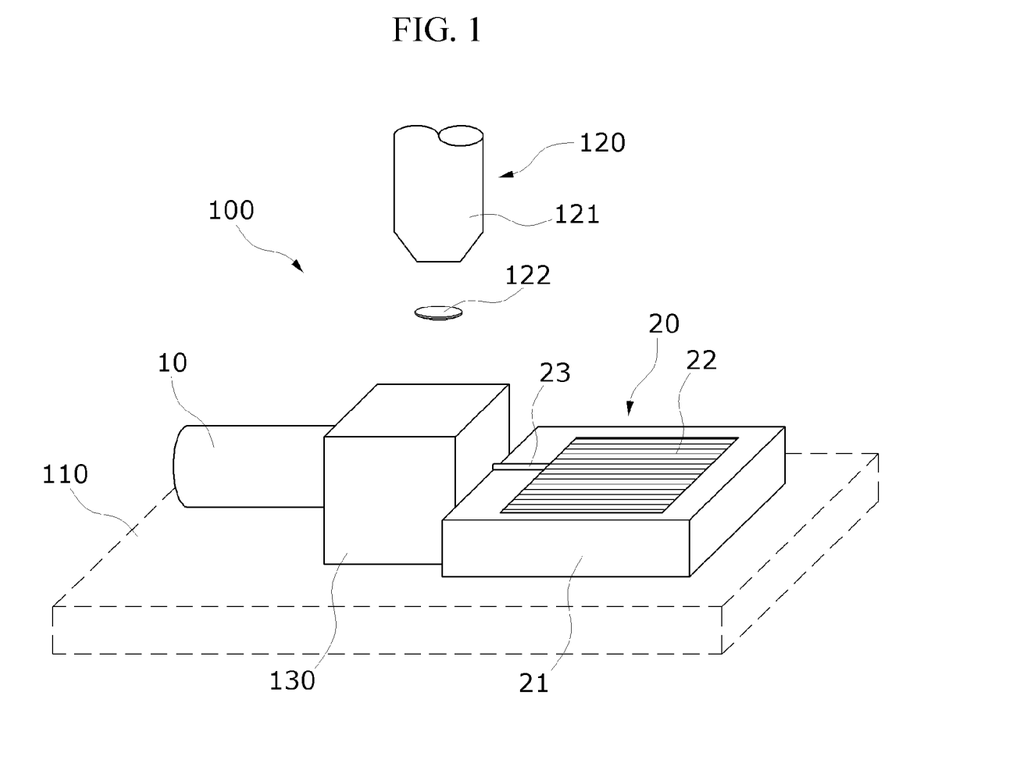
FIG. 1 is a perspective view illustrating an optical connection apparatus according to an embodiment of the present invention.
Figure 2:
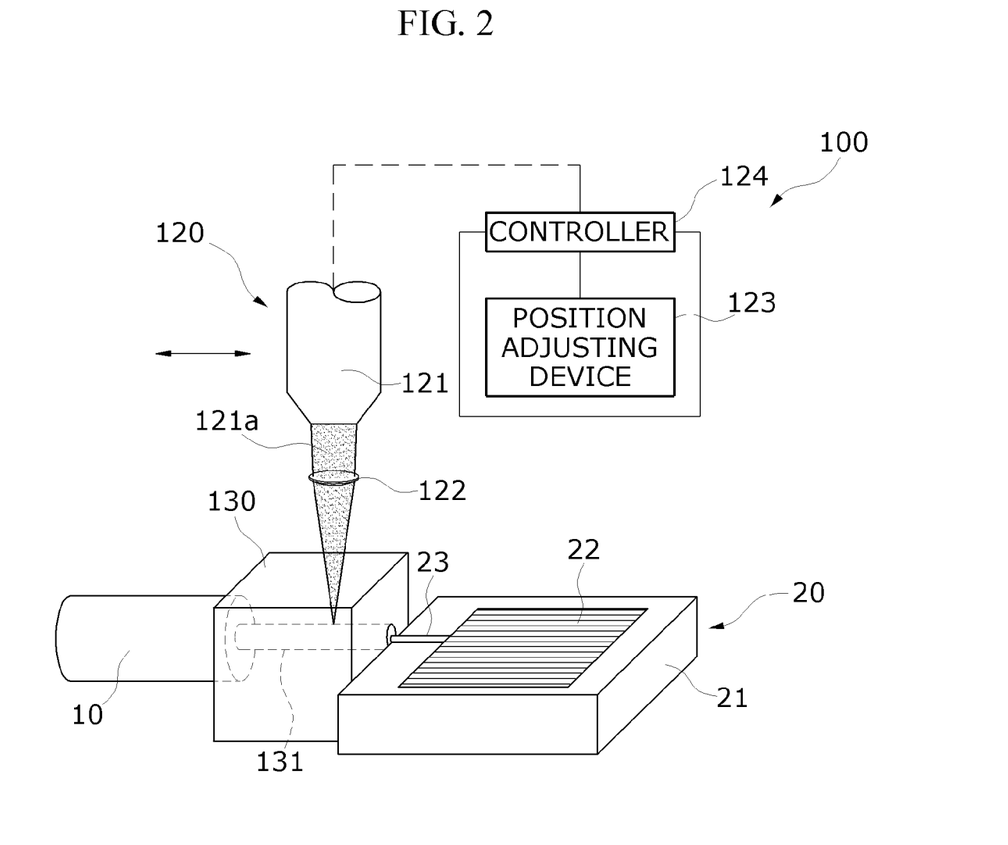
FIG. 2 is an operation relationship view illustrating the operation relation between components of the optical connection apparatus according to the embodiment of the present invention.

FIG. 1 is a perspective view illustrating an optical connection apparatus according to an embodiment of the present invention, and FIG. 2 is an operation relationship view illustrating the operation relation between components of the optical connection apparatus according to the embodiment of the present invention.

Referring to FIGS. 1 and 2 in conjunction with each other, an optical fiber 10 is a transmission line formed of a transparent fiber material in which optical energy is introduced and optical transmission is performed. The optical fiber 10 transmits optical signals and optical energy by repeating waveforms resulting from a total reflection or a refractive index gradient at an interface.

An integrated circuit (IC) chip 20 is a silicon photonic IC chip in which an optical circuit (an optical IC) 22 is implemented on a silicon substrate 21. The IC chip 20 may be provided as an edge coupling type IC chip which allows an output from the side surface.

When a planar optical waveguide 23 of the IC chip 20 is directly connected to the optical fiber 10, a great optical loss occurs due to difference in diameter therebetween, which causes difficulty in optical connection.

The conventional art employs an 'active alignment' method in which a state of optical alignment is checked while monitoring optical input/output power and is adjusted to minimize optical loss. However, such an active alignment method is time-consuming and has a great limitation on mass production. That is, when the alignment of corresponding parts is lost, there are difficult problems in optical imprinting.

To this end, an optical connection apparatus 100 according to the present invention largely includes a position fixing portion 110 and an optical-imprinting portion 120.

The position fixing portion 110 fixes the optical fiber 10 and the IC chip 20, each having a different end portion, while interposing a connection member 130 that is optically-imprintable between the optical fiber 10 and the IC chip 20. In this case, the end portion of the optical fiber 10 has a diameter different from that of the end portion of the IC chip 20.

The optical-imprinting portion 120 emits light 121a to the connection member 130 to form a three-dimensional (3D) optical waveguide 131 in the connection member 130 that connects the optical fiber 10 to the IC chip 20.

The optical-imprinting portion 120 includes a laser 121, a focusing lens 122, a position adjusting device 123, and a controller 124.

The laser 121 emits light 121a to a predetermined point of the connection member 130. The predetermined point is a position to which the light 121a is emitted, and represents a part of the 3D optical waveguide 131 formed in the connection member 130.

The focusing lens 122 allows the light 121a emitted from the laser 121 to pass therethrough.

The position adjusting device 123 shifts the position of the laser 121 and the focusing lens 122.

When the laser 121 emits the light 121a, the light 121a imprints a focusing position through the focusing lens 122, and such optical imprinting allows the refractive index of the connection member 130 to be varied. When the laser 121 and the focusing lens 122 are moved by the position adjusting device 123, a refractive index change is generated while varying the focusing position on which the light 121a is focused, so that the 3D optical waveguide 131 is formed.

The controller 124 controls driving of the laser 121 and the position adjusting device 123. In this case, the controller 124 drives the position adjusting device 123 by comparing a predetermined reference value with the refractive index value of the connection member 130 that is varied at a time of the connection member 130 being imprinted by the light 121a passing through the focusing lens 122.

Here, the refractive index value is varied since the light 121a imprints the connection member 130 while varying the focusing position. The predetermined reference value represents a range in which the 3D optical waveguide 131 performs input and output of the light 121a. Accordingly, the range may be set according to the installation environment.

The connection member 130 may include at least one material selected from the group consisting of silica, phosphates, heavy metal oxides, chalcogenides, and halides such that the refractive index of the connection member 130 is varied by the light emitted through the optical-imprinting portion 120.

In addition, the connection member 130 may include at least one material selected from the group consisting of lithium fluoride, lithium niobate, strontium barium niobate, and yttrium aluminum garnet such that the refractive index of the connection member 130 is varied by the light emitted through the optical-imprinting portion 120.

Figure 3:
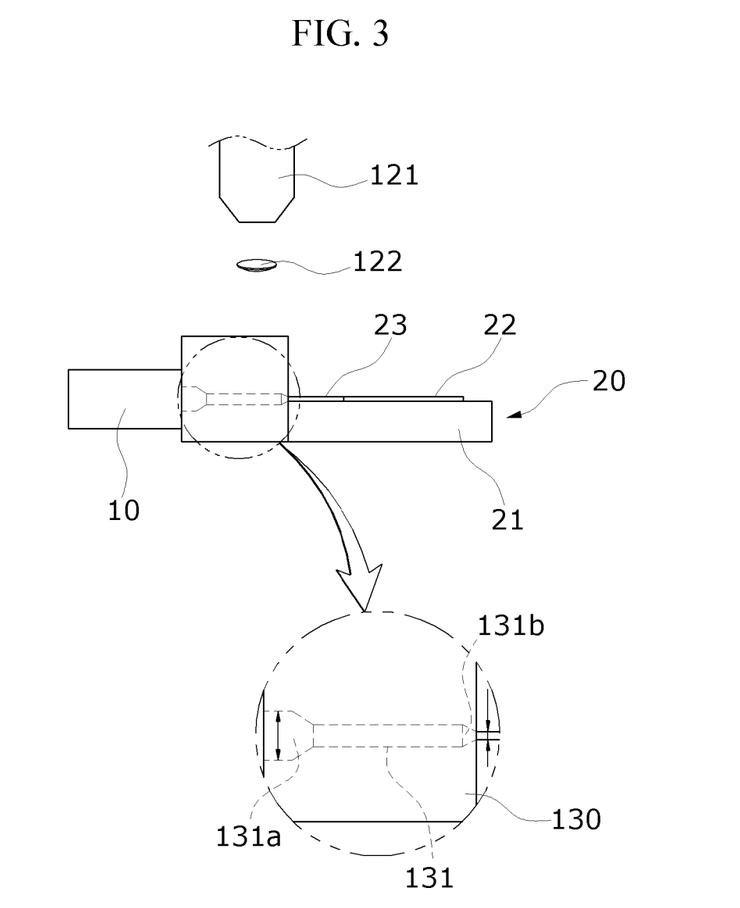
FIG. 3 is a side view illustrating the optical connection apparatus according to the embodiment of the present invention.

FIG. 3 is a side view illustrating the optical connection apparatus according to the embodiment of the present invention.

Referring to FIG. 3, the optical-imprinting portion 120 adjusts both ends of the 3D optical waveguide 131 to correspond to the shape of the optical fiber 10 and the planar optical waveguide 23 of the IC chip 20. That is, since the end portion of the optical fiber 10 has a size (diameter) larger than that of the end portion of the planar optical waveguide 23, when the optical-imprinting portion 120 connects the both ends of the 3D optical waveguide 131 to the optical fiber 10 and the planar optical waveguide 23, loss of the light 121a may occur.

Accordingly, one end of the 3D optical waveguide 131 to which the optical fiber 10 is connected (a first end portion; 131a) is formed in a tapered shape, and the other end of the 3D optical waveguide 131 to which the planar optical waveguide 23 is connected (a second end portion; 131b) is formed in an inverse tapered shape.

Accordingly, the 3D optical waveguide 131 allows the optical fiber 10 and the planar optical waveguide 23 of the IC chip 20 to effectively match with each other, minimizing optical loss.

FIGS. 4 to 8 are views illustrating various 3D optical waveguides of the optical connection apparatus according to the embodiment of the present invention.

Figure 4:
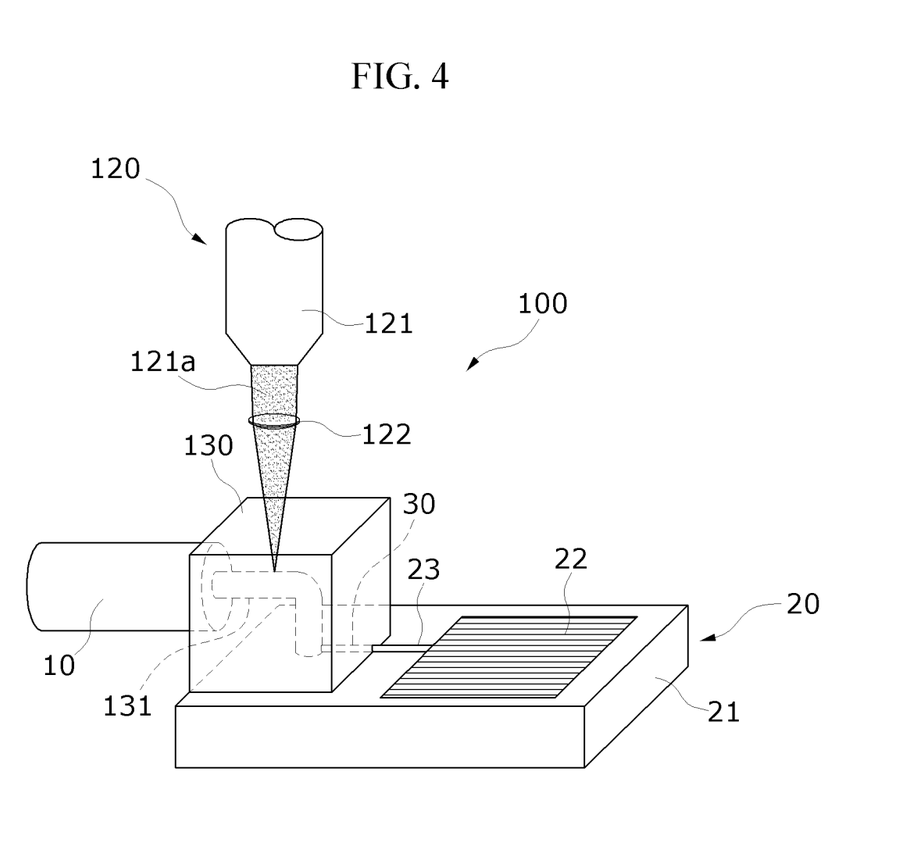
FIGS. 4 to 8 are views illustrating various 3D optical waveguides of the optical connection apparatus according to the embodiment of the present invention.

Referring to FIG. 4, the optical connection apparatus 100 is formed such that an IC chip 20 is connected to an optical fiber 10. In this case, a planar optical waveguide 23 is provided at one end portion thereof with a grating coupler that enables input/output of light. In this case, the grating coupler is used to allow input/output of light of the optical waveguide 23 to be directed upward from the IC chip 20. A description of the process of forming a 3D optical waveguide 131 of the optical connection apparatus 100, which has been described above with reference to FIGS. 1 to 3, will be omitted.

Figure 5:
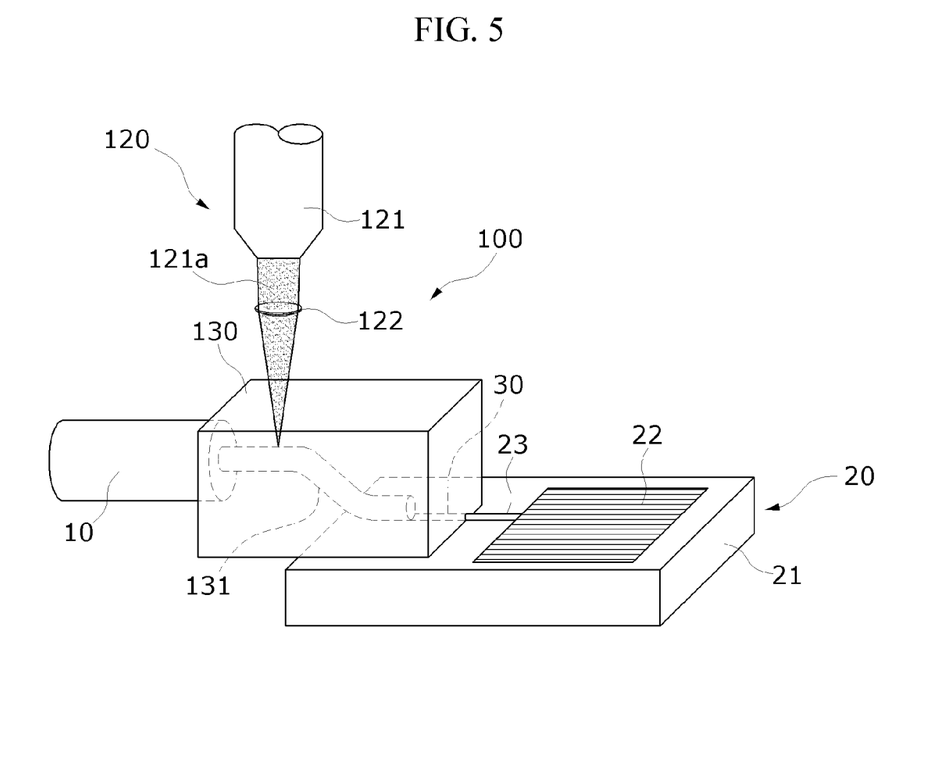

Referring to FIG. 5, the optical connection apparatus 100 employs a connection method using a mode converter 30 that is based on evanescent coupling with a planar optical waveguide 23. The mode converter 30 is a device for effectively connecting the planar optical waveguide 23 and the optical fiber 10, each having an end portion differing in size and shape.

Figure 6:
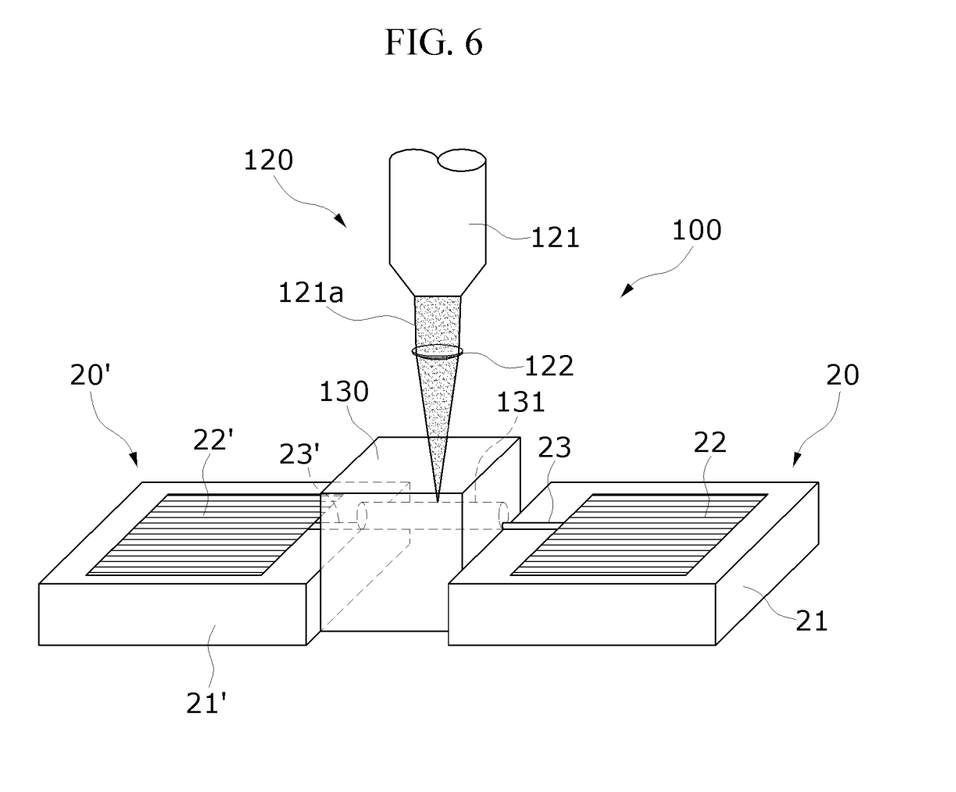

Referring to FIG. 6, the optical connection apparatus 100 has a structure for connecting different IC chips 20 and 20' to each other. With the connection member 130 connected between the different IC chips 20 and 20', the 3D optical waveguide 131 allows the different IC chips 20 and 20' to match and connect with each other through the optical connection apparatus 100.

Figure 7:
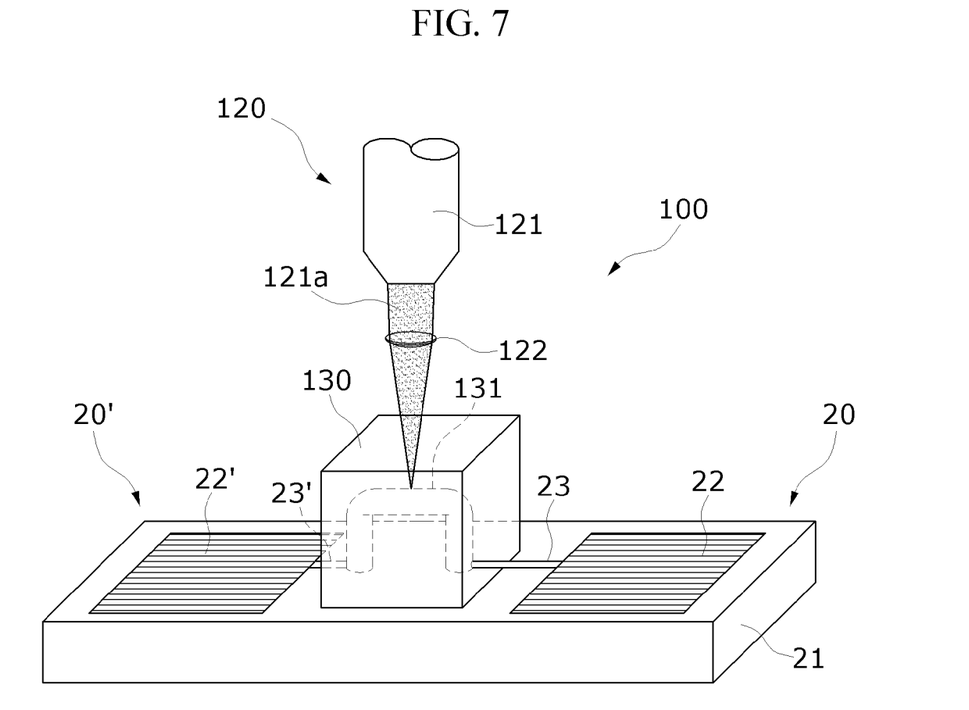

Referring to FIG. 7, the optical connection apparatus 100 has a structure for connecting IC chips 20 and 20' to each other using a grating coupler type scheme. In this case, the connection member 130 is located above planar optical waveguides 23 and 23' of the IC chips 20 and 20'. Accordingly, the connection member 130 forms the 3D optical waveguide 131 through the optical connection apparatus 100. The 3D optical waveguide 131 is attached or fixed to the planar optical waveguides 23 and 23'.

Figure 8:
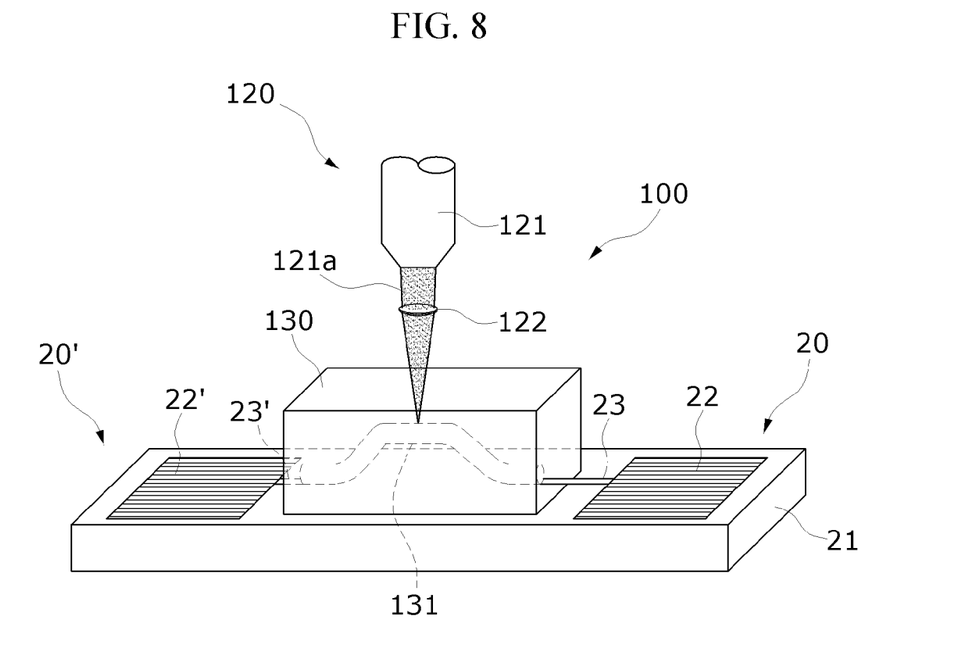

Referring to FIG. 8, the optical connection apparatus 100 has a structure in which the 3D optical waveguide 131 is connected between two IC chips 20 and 20', each having an optical coupler-type input/output using evanescent coupling.

Figure 9:
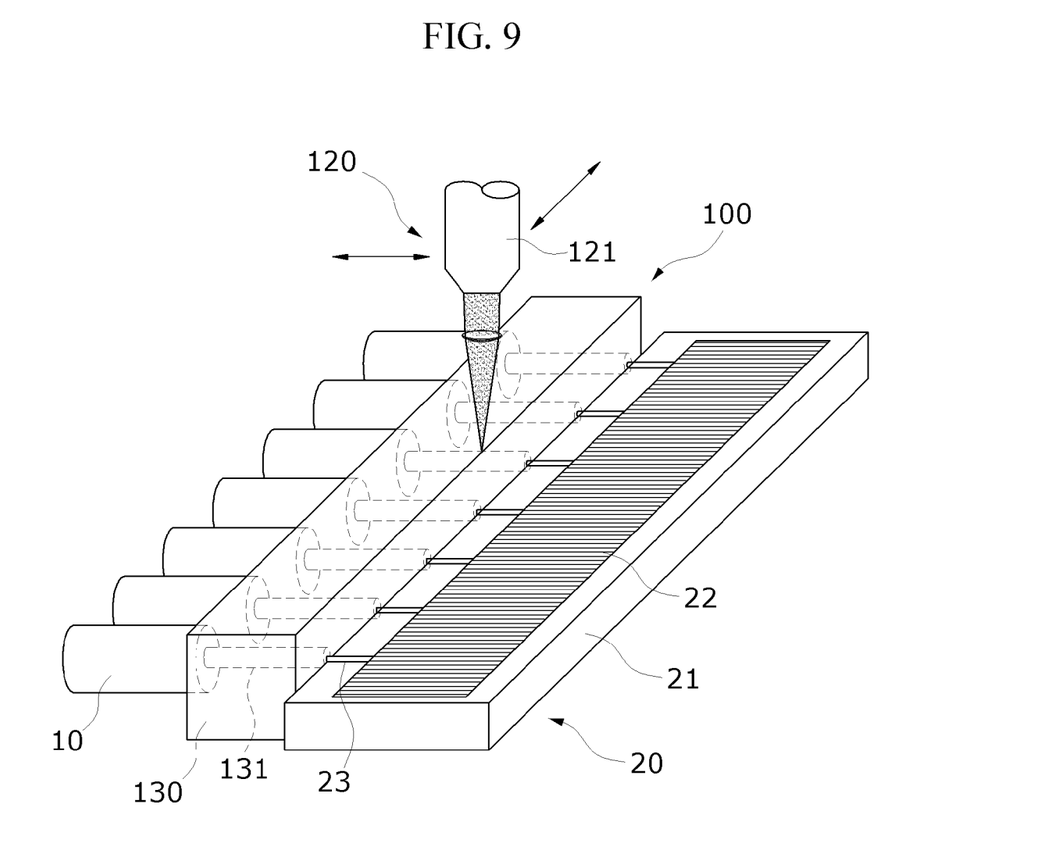
FIG. 9 is a view illustrating an optical connection apparatus according to another embodiment of the present invention.
Figure 10:
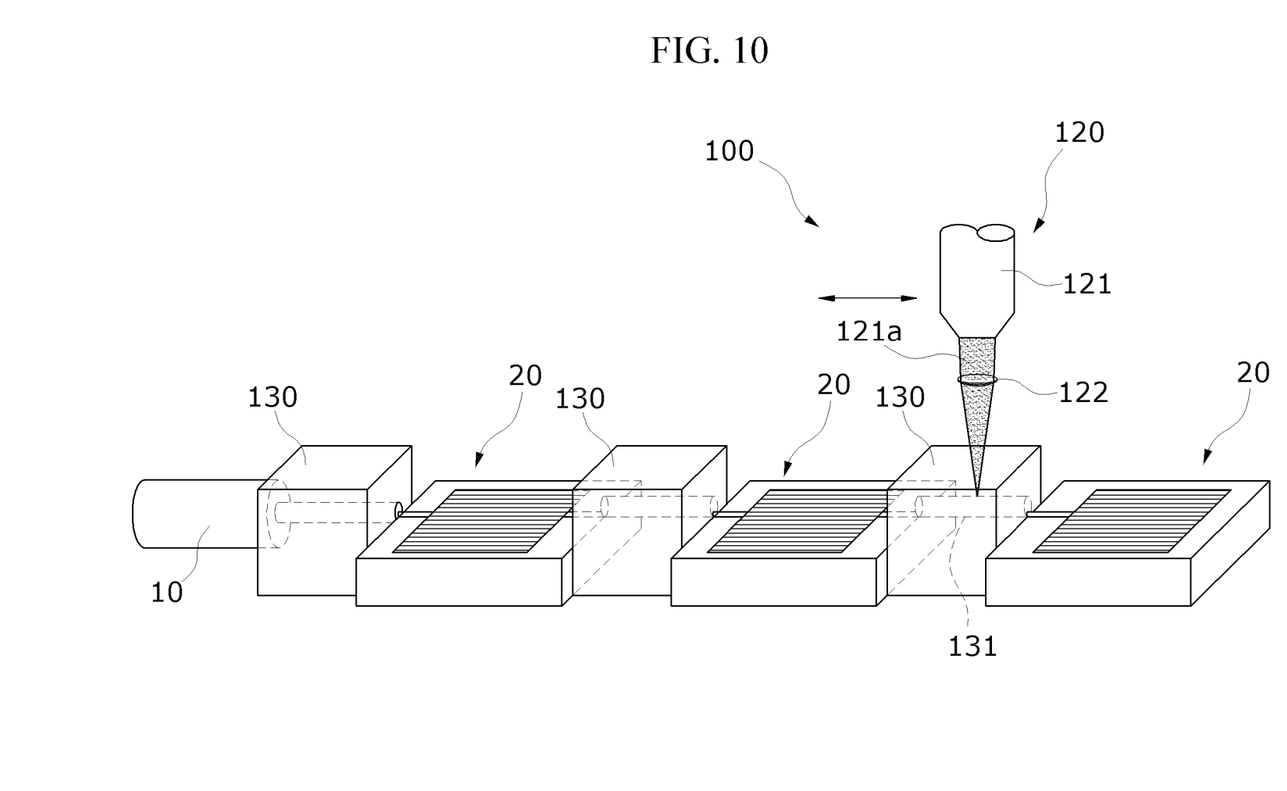
FIG. 10 is a view illustrating an optical connection apparatus according to still another embodiment of the present invention.

Referring to FIGS. 9 and 10 in conjunction with each other, the optical connection apparatus 100 has a structure for connecting an optical fiber 10 to an IC chip 20 having a plurality of inputs/outputs.

In this case, the position fixing portion 110 (see FIG. 1) fixes a plurality of optical circuits (i.e., an optical fiber 10 and an IC chip 20) each having an end portion differing in size and shape, and positions the connection member 130 that is optically imprintable on the plurality of optical circuits (i.e., the optical fiber 10 and the IC chip 20).

In this case, the optical-imprinting portion 120 emits light to the connection member 130 to form the 3D optical waveguide 131 in the connection member 130 that connects the optical circuits.

Figure 11:
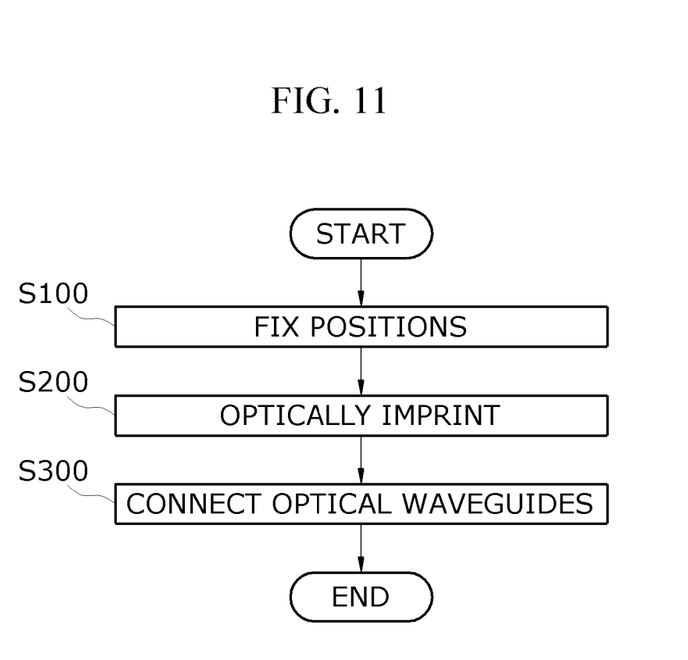
FIG. 11 is a flowchart showing an optical connection method according to an embodiment of the present invention.

FIG. 11 is a flowchart showing an optical connection method according to an embodiment of the present invention.

Referring to FIG. 11, the optical connection method includes fixing positions (S100), optically imprinting (S200), and connecting optical waveguides (S300).

In operation S100, positions of optical circuits each having a different end portion are fixed while interposing a connection member that is optically imprintable between the optical circuits.

In operation S200, light is emitted to the connection member to optically imprint the connection member such that a 3D optical waveguide is formed in the connection member.

In operation S300, both ends of the 3D optical waveguide are connected to the optical circuits. Since the method of connecting each end of the 3D optical waveguide to the optical circuit is the same as that described above, a detailed description thereof will be omitted.

According to the above-described present invention, an optically imprintable connection member is placed and fixed at a position that requires a connection, and then is optically imprinted to form a 3D optical waveguide. The 3D optical waveguide serves to connect optical circuits having different end portions.

Accordingly, the 3D optical waveguide allows the optical circuits having different end portions to match with each other, so that optical loss is minimized.

As is apparent from the above, the optical connection apparatus and the optical connection method can form a three-dimensional (3D) optical waveguide by placing and fixing a connection member capable of being optically imprinted at a position requiring a connection, and optically imprinting the connection member. The 3D optical waveguide can serve to connect optical circuits having different end portions.

Accordingly, the 3D optical waveguide can allow the optical circuits having different end portions to match with each other, minimizing optical loss.

Although the present invention has been described with reference to the accompanying drawings for illustrative purposes, it should be appreciated by those skilled in the art that various modifications, equivalents, and other embodiments are possible without departing from the scope and sprit of the present invention.

What is claimed is:

1. An optical connection apparatus comprising:
a position fixing portion configured to fix optical circuits having different end portions, while interposing a connection member that is optically imprintable between the optical circuits, wherein the optical circuits include an optical fiber and a photonic integrated circuit (PIC) chip; and
an optical-imprinting portion configured to emit light to the connection member to form a three-dimensional (3D) optical waveguide in the connection member, which connects the optical fiber to the PIC chip.

2. The optical connection apparatus of claim 1, wherein the optical-imprinting portion adjusts both ends of the 3D optical waveguide to correspond to sizes and shapes of end portions of both a planar optical waveguide of the PIC chip and the optical fiber.

3. The optical connection apparatus of claim 1, wherein the optical-imprinting portion forms both ends of the 3D optical waveguide into tapered shapes to correspond to sizes and shapes of end portions of both a planar optical wave guide of the PIC chip and the optical fiber.

4. The optical connection apparatus of claim 1, wherein both ends of the 3D optical waveguide are connected with a mode converter formed of a grating coupler.

5. The optical connection apparatus of claim 1, wherein the optical-imprinting portion includes:
a laser configured to emit light to a predetermined point of the connection member;
a focusing lens through which the light emitted by the laser passes; and
a position adjusting device configured to shift a position of the laser and the focusing lens.

6. The optical connection apparatus of claim 5,
wherein the optical-imprinting portion further includes a controller configured to control driving of the laser and the position adjusting device,
wherein the controller compares a predetermined reference value with a refractive index value of the connection member which varies when the connection member is being imprinted by the light passing through the focusing lens, and drives the position adjusting device based on the comparison.

7. The optical connection apparatus of claim 1, wherein the connection member includes at least one material selected from the group consisting of silica, a phosphate, a heavy metal oxide, a chalcogenide, and a halide such that the connection member has a refractive index varied by the light emitted by the optical-imprinting portion.

8. The optical connection apparatus of claim 1, wherein the connection member includes at least one material selected from the group consisting of lithium fluoride, lithium niobate, strontium barium niobate, and yttrium aluminum garnet such that the connection member has a refractive index varied by the light emitted by the optical-imprinting portion.

9. An optical connection apparatus comprising:
a position fixing portion configured to fix a plurality of optical circuits having end portions differing in size and shape, and to place at least one connection member that is optically imprintable on the plurality of optical circuits, wherein the plurality of optical circuits include one or more optical fibers and one or more photonic integrated circuit (PIC) chips; and
an optical-imprinting portion configured to emit light to the connection member to form a three-dimensional (3D) optical waveguide in the connection member that connects the one or more optical fibers to the one or more PIC chips.

10. The optical connection apparatus of claim 9, wherein the optical-imprinting portion includes:
a laser configured to emit light to a predetermined point of the connection member;
a focusing lens through which the light emitted by the laser passes; and
a position adjusting device configured to shift a position of the laser and the focusing lens.

11. The optical connection apparatus of claim 10,
wherein the optical-imprinting portion further includes a controller configured to control driving of the laser and the position adjusting device,
wherein the controller compares a predetermined reference value with a refractive index value of the connection member which varies when the connection member is being imprinted by the light passing through the focusing lens, and drives the position adjusting device based on the comparison.

12. An optical connection method comprising:
fixing positions of optical circuits having different end portions, while interposing a connection member that is optically imprintable between the optical circuits, wherein the optical circuits include an optical fiber and a photonic integrated circuit (PIC) chip;
optically imprinting the connection member by emitting light to the connection member to form a three-dimensional (3D) optical waveguide in the connection member; and
connecting both ends of the 3D optical waveguide to the optical fiber and the PIC chip.

13. The optical connection method of claim 12, wherein the optically imprinting includes forming the both ends of the 3D optical waveguide into tapered shapes to correspond to sizes and shapes of the end portions of the optical circuits.

* * * * *